United States Patent [19]

Cohrs et al.

[11] 4,016,110

[45] Apr. 5, 1977

[54] PROCESS FOR THE PREPARATION OF EXPANDABLE MICROSPHERES

[75] Inventors: William E. Cohrs, Midland; Roland E. Gunderman, Clare; William A. Crozier, Midland, all of Mich.

[73] Assignee: The Dow Chemical Company, Midland, Mich.

[22] Filed: July 26, 1972

[21] Appl. No.: 275,268

[52] U.S. Cl. .............................. 260/2.5 B; 252/316
[51] Int. Cl.² ............................................. C08J 9/20
[58] Field of Search ................. 252/316; 156/79; 260/2.5 B, 85.5 HC, 85.5 F

[56] References Cited

UNITED STATES PATENTS

| | | | |
|---|---|---|---|
| 2,408,656 | 10/1946 | Kirk | 252/317 X |
| 3,359,130 | 12/1967 | Goldman | 260/2.5 B X |
| 3,427,250 | 2/1969 | Haas et al. | 252/316 |
| 3,505,248 | 4/1970 | Banks et al. | 260/2.5 B |
| 3,615,972 | 10/1971 | Morehouse, Jr. et al. | 156/179 |

Primary Examiner—Richard D. Lovering
Attorney, Agent, or Firm—R. B. Ingraham

[57] ABSTRACT

Uniformity in the polymerization of expandable microspheres disclosed in U.S. Pat. 3,615,972 is improved by replacing a copolymer of adipic acid and diethanol amine with citric acid.

4 Claims, No Drawings

PROCESS FOR THE PREPARATION OF EXPANDABLE MICROSPHERES

Expansible thermoplastic polymer particles containing volatile fluid foaming agent are well known and described in U.S. Pat. No. 3,615,972. Such particles are popularly known as expandable microspheres and consist of a synthetic resinous thermoplastic shell containing a single symmetrical encapsulated volatile fluid foaming agent therein as a distinct and separate liquid phase. When such expandable microspheres are heated to a temperature sufficient to heat plastify or soften the thermoplastic resinous shell the particles expand to form monocellular gas filled spheres. Such expandable microspheres have a wide variety of applications in paper, coatings, as lightweight fillers and the like. In employing the polymerization procedure set forth in U.S. pat. No. 3,615,972, as part of the suspending system there is employed an aqueous solution of a copolymer prepared from the combination of diethanol amine and adipic acid in equimolar proportions. Substantial difficulty has been encountered in maintaining desired quality control of the amine/acid copolymer. Variations in the properties of the amine/acid copolymer result in batch to batch variation of expandable microspheres prepared employing the copolymer.

It would be desirable if there were available an improved process for the preparation of expandable synthetic resinous microspheres.

It would also be desirable if there were available an improved composition for the preparation of such expandable microspheres.

It would further be desirable if there were an improved simplified method for the preparation of improved expandable microspheres which would result in improved batch to batch uniformity.

These benefits and other advantages in accordance with the present invention are achieved in a method for the preparation of expandable synthetic resinous microspheres, the method comprising suspending in water a colloidal silica dispersing agent, a polymerizable monomeric composition, a volatile liquid expanding agent, dispersing the volatile liquid expanding agent and monomeric composition within the water as a plurality of droplets, polymerizing the monomeric material to form a plurality of particles, the particles having a thermoplastic resinous shell of generally spherical configuration, the particles generally symmetrically encapsulating a single liquid occlusion as a distinct and separate liquid phase within the particle, the particles being generally impenetrable to the liquid raising agent, the improvement which comprises employing from about 0.2 to about 1 part by weight of citric acid per 100 parts by weight of monomeric composition in the substantial absence of a polymer of equimolar parts of adipic acid and diethanol amine.

Also contemplated within the scope of the invention is the suspension of a polymerizable monomer for the preparation of synthetic resinous expandable microspheres, said microspheres having incorporated within a thermoplastic resinous shell of generally spherical configuration an occlusion of a distinct but separate liquid phase of a volatile fluid foaming agent, the polymer shell being generally impenetrable to the foaming agent, the composition consisting essentially of water containing colloidal silica dispersing agent, the water having dispersed therethrough a plurality of droplets of a polymerizable monomeric composition and a volatile fluid foaming agent, the improvement comprising from about 0.2 part to 1 part by weight of citric acid per 100 parts by weight of monomeric mixture, the aqueous phase being substantially free of an equimolar copolymer of diethanol amine and adipic acid.

The present invention is an improvement upon the process disclosed in U.S. Pat. No. 3,615,972 and is applicable to the preparation of synthetic thermoplastic resinous expandable particles disclosed therein. The teaching of U.S. Pat. No. 3,615,972 is herewith incorporated by reference. The process of the present invention is applicable to all known expandable microsphere preparations. The citric acid used in the practice of the present invention may be hydrous or anhydrous or may be employed in the form of an aqueous solution; or alternately, it may be dispersed within the monomer. The weight proportions as hereinbefore set forth apply to the citric acid monohydrate. The preferred range of anhydrous citric acid is from about 0.22 to 0.30 part per hundred of polymerizable component. Generally it is desirable to add citric acid to the aqueous phase. However, if desired it may be incorporated within the oil or monomer blowing agent phase and is quickly extracted therefrom by the aqueous phase during initial mixing of the reactants.

By way of further illustration, styrene/acrylonitrile/divinylbenzene microspheres are prepared in the following manner: a water phase is prepared by admixing colloidal silica, potassium dichromate and sodium chloride in the quantities set forth in Table I. For purposes of illustration, a comparative polymerization is made employing the amine/acid copolymer hereinbefore referred to. In the case of Run 2 containing the amine/acid copolymer, the pH is adjusted to about 4 employing hydrochloric acid. A reactor is then cooled to about 20° C.; the aqueous phase is then added to the reactor and the reactor agitated. The reactor is evacuated, purged with nitrogen; again evacuated and the polymerizable or monomer phase added. The contents of the reactor are agitated as violently as possible for a period of about 20 minutes. The contents of the reactor are then pumped from the reactor to a mechanical homogenizer. The discharge from the homogenizer is returned to the reactor until the desired degree of dispersion is obtained. The conduits from the reactor to the homogenizer and return line are gas purged and the liquid contents thereof are returned to the reactor. The reactor is agitated at a speed of about 100 revolutions per minute and maintained at a temperature of 60° C. for a period of 23 hours. At the end of the 23 hour period, the contents of the reactor are cooled to 23° C. and the product discharged. The results are set forth in Table I which follows.

TABLE I

| COMPONENTS | RUN 1* | RUN 2* |
|---|---|---|
| Deionized water | 3144 | 3144 |
| Colloidal silica 30 weight percent aqueous dispersion | 180 | 180 |
| Copolymer of diethanol amine and adipic acid | — | 12 |
| Citric acid | 3 | — |
| Potassium dichromate | 1.2 | 1.2 |
| Sodium chloride | 24 | 24 |
| pH adjusted to | no adjustment | 4.0 |
| Styrene | 720 | 720 |
| Acrylonitrile | 480 | 480 |
| Divinylbenzene | 1 | 1 |
| Neopentane | 480 | 480 |
| Lauroyl peroxide | 4.8 | 4.8 |
| Properties of Product | | |

TABLE 1-continued

| COMPONENTS | RUN 1* | RUN 2* |
| --- | --- | --- |
| % Yield | 89 | 89 |
| % Conversion | 90 | 90 |
| % Encapsulation | 95 | 97 |
| Bulk Density | 1.0 | 0.9 |
| Particle size spread | 1 – 22 microns | 2 – 17 microns |
| Particle size average | 10 microns | 10 microns |

*All component values are in grams unless otherwise indicated

Repeated polymerization using the composition as shown in Run 1 provides substantially improved consistency of results over that employed using the formulation of Run 2. Similar beneficial results are obtained when employing the monomeric compositions set forth in U.S. Pat. No. 3,615,972.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. In a method for the preparation of expandable synthetic resinous microspheres, the method comprising
    suspending in water a colloidal silica dispersing agent, a polymerizable monomeric composition, a volatile liquid expanding agent,
    dispersing the volatile liquid expanding agent and monomeric composition within the water as a plurality of droplets,
    polymerizing the monomeric material to form a plurality of particles, the particles having a thermoplastic resinous shell of generally spherical configuration, the particles generally symmetrically encapsulating a single liquid occlusion as a distinct and separate liquid phase within the particle, the particles being generally impenetrable to the liquid raising agent, the improvement which comprises
    employing from about 0.2 to about 1 part by weight of citric acid per 100 parts by weight of monomeric composition in the substantial absence of a polymer of equimolar parts of adipic acid and diethanol amine.

2. The method of claim 1 wherein the citric acid is present in an amount of from about 0.22 to 0.30 part per hundred of the monomeric composition.

3. In a method for the preparation of expandable synthetic resinous microspheres, the method comprising
    suspending in water a colloidal silica dispersing agent, a polymerizable monomeric composition, the composition consisting essentially of styrene, acrylonitrile and divinylbenzene, a volatile liquid expanding agent, the agent consisting essentially of neopentane,
    dispersing the volatile liquid expanding agent and monomeric composition within the water as a plurality of droplets,
    polymerizing the monomeric material in the presence of lauroyl peroxide to form a plurality of particles, the particles having a thermoplastic resinous shell of generally spherical configuration, the particles generally symmetrically encapsulating a single liquid occlusion as a distinct and separate liquid phase within the particle, the particles being generally impenetrable to the liquid raising agent, the improvement which comprises
    employing from about 0.2 to about 1 part by weight of citric acid per 100 parts by weight of monomeric composition in the substantial absence of a polymer of equimolar parts of adipic acid and diethanol amine.

4. The method of claim 3 wherein the citric acid is present in an amount of from about 0.22 to 0.30 part per hundred of the monomeric composition.

* * * * *